Patented Nov. 11, 1930

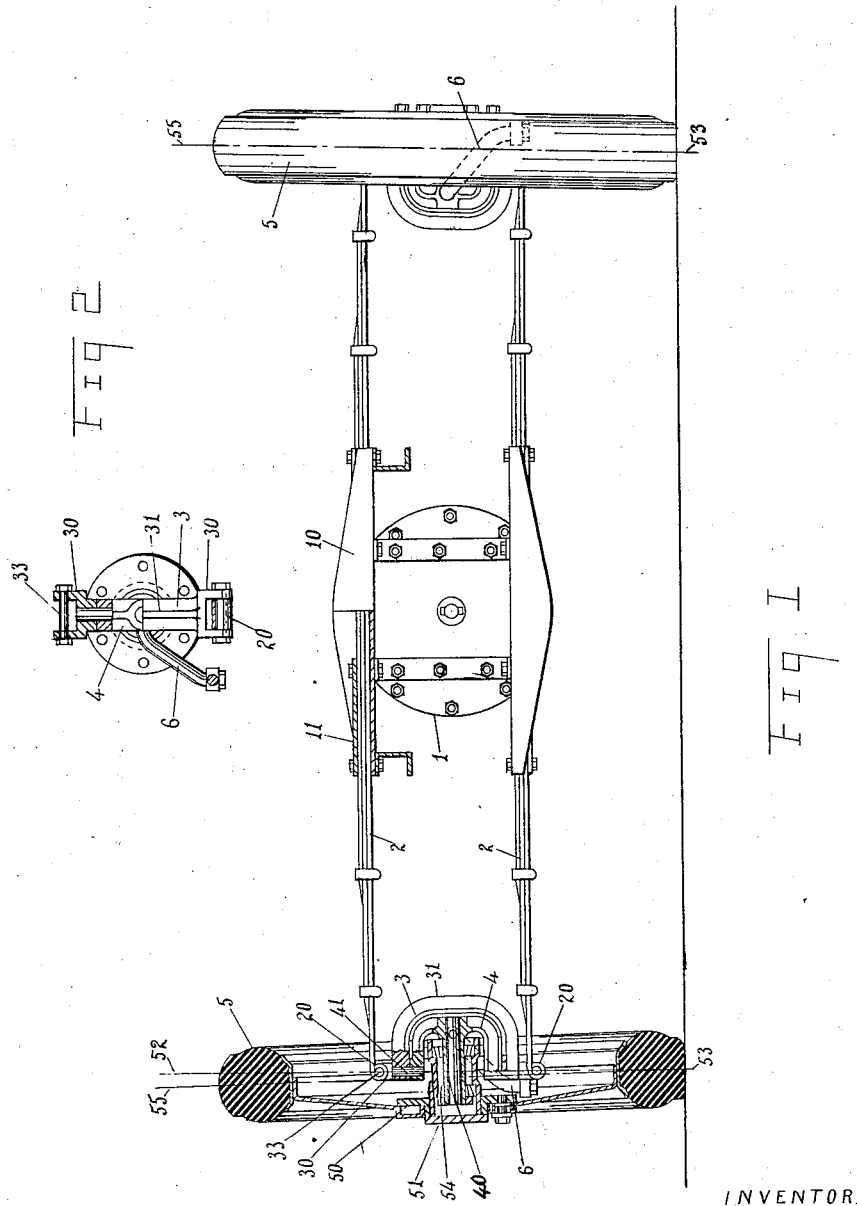

1,781,205

UNITED STATES PATENT OFFICE

JAMES A. WRIGHT, OF MONTREAL, QUEBEC, CANADA

FRONT-AXLE ASSEMBLY

Application filed January 8, 1927. Serial No. 159,909.

This invention relates to spring suspension and wheel mounting of motor vehicles and particularly to the front axle assembly of vehicles having flexible axles and independent wheel suspension.

The object of the invention is to provide an improved wheel mounting and spring suspension particularly for the front wheels of motor vehicles, whereby the load is transferred from the springs to the wheel at a point directly above the center of road contact of the tire tread.

A further object is to provide a front wheel mounting adapted to pivot in the central plane of the wheel whereby the steering control is greatly improved.

A further object is to provide an improved spring suspension, having no radius rods or shackle links, whereby the wheels are maintained parallel to the center line of the chassis during their independent action.

A further object is to provide a spring suspension in which the unsprung weight is reduced to a minimum.

A further object is to provide an improved arrangement of wheel bearings, balanced on either side of the load plane of the wheel.

A further object is to provide an improved mounting of the transverse spring on the chassis, whereby the springs, while maintaining a high degree of stability, supply a rapid flexibility, giving smooth and comfortable running.

A further object is to provide an improved form of wheel carrier.

The invention consists in mounting the wheels on bearings balanced on the load plane, supported on wheel carriers pivoted vertically and connected to transverse springs in such plane, and having the steering lever mounted within the wheel.

The invention is shown and described in one form in which it may be applied, but I do not limit my claim to this particular construction.

Reference is made to the accompanying drawings in which:—

Fig. 1 is a front elevation partly in section.

Fig. 2 is a view of the wheel mounting from the inside, partly in section.

The central frame 1, of the vehicle has housings 10 on seats above and below the frame, in which the transverse springs 2, are held parallel and secured in place by the anchor plates 11, the housings 10, extending outwardly from the frame 1.

The springs 2, are provided with looped ends 20.

The disc wheels 5, have hubs 50, mounted on roller bearings 54, running on stub axles 40, and spaced apart equally on either side of the load line 52. These stub axles 40, extend outwardly from the center of an arched member 4, from the ends of which the pivot pins 41, project in the line 52, above the point 53, of road contact of the tire.

Pivoted on these pins 41 is an arched yoke 3, having a rib 31, and projecting forks 30. These forks 30, carry bolts 33, on which the loops 20, of the springs 2, are journalled on the load plane of the wheel 5.

The steering lever 6, is secured to one side of the center of the arch 4, at the inner end of the stub axle 40, and extends downwardly and outwardly crossing the load plane of the wheel as shown by the dotted lines at the right in Fig. 1. This lever 6, is coupled in the usual way to a similar lever in the opposite wheel and together they are controlled by the steering gear of the vehicle.

If the wheels are inclined outwardly as shown in Fig. 1, the load plane 52—53 will vary slightly from the central plane 55—53 of the wheel.

With this construction, there is provided a flexible axle journalled on bearings, balanced on the load plane of the wheel, whereby the load is equalized on each bearing and any tendency to displacement or to throw the wheel off its gyroscopic axis at high speeds is prevented. Wheel wobble and pounding of bearings, at present common when bearings are loose will be entirely obviated.

The wheel carrier being pivoted vertically in the load plane, the wheel is steered without effort and pivots on the center point of road contact, under perfect control from the lever working across the load plane, and it is not affected by road stresses which tend to strain the steering gear in other arrangements.

The springs being journalled at their ends to the wheel carriers in the load plane of the wheels, the load is distributed between points as far apart as possible and the wheels being confined to independent vertical movement, a high degree of stability is secured to the chassis, and side sway will be eliminated to a great extent.

The elimination of radius rods and shackle links reduces the unsprung weight to a minimum, and decreases the wear and tear on the entire vehicle.

The rapid spring action taking effect at the most efficient point will provide improved traction, diminish the tread wear, and give smoother and more comfortable riding.

The parallel action of the springs maintains the chassis vertical to the roadway and prevents it from being effected by road irregularities which disturb either wheel.

What I claim is:—

In a stub axle assembly, the combination of a transverse spring suspension with a disc wheel having a sleeve hub, a wheel carrier comprising an arched frame having transverse bearings projecting outwardly from its ends to which the looped ends of the springs are journalled, and a stub axle mounted in the sleeve hub of the wheel having its inner end arched outwardly over the sleeve hub, and pivot pins on which the adjacent ends of the two arches are pivoted to provide a vertical pivot to the stub axle and wheel.

JAMES A. WRIGHT.